Dec. 13, 1966 M. F. MELLOW 3,292,157

DIGITAL SATELLITE DISPLAY SYSTEM

Filed June 25, 1963 5 Sheets-Sheet 1

INVENTOR.
MARTLEY F. MELLOW

BY Wade Koontz and Martin J. Finnegan
ATTORNEYS

Dec. 13, 1966 M. F. MELLOW 3,292,157

DIGITAL SATELLITE DISPLAY SYSTEM

Filed June 25, 1963 5 Sheets-Sheet 2

INVENTOR.
MARTLEY F. MELLOW
BY
ATTORNEYS

INVENTOR.
MARTLEY F. MELLOW
BY Wade Koontz and Martin J. Finnegan
ATTORNEYS

INVENTOR.
MARTLEY F. MELLOW
BY Wade Koontz and Martin J. Finnegan
ATTORNEYS

INVENTOR.
MARTLEY F. MELLOW
BY Wade Koontz and Martin J. Finnegan
ATTORNEYS

United States Patent Office 3,292,157

Patented Dec. 13, 1966

3,292,157

DIGITAL SATELLITE DISPLAY SYSTEM

Martley F. Mellow, Waltham, Wash., assignor to the United States of America as represented by the Secretary of the Air Force Filed June 25, 1963, Ser. No. 290,570
3 Claims. (Cl. 340—172.5)

The invention described herein may be manufactured and used by or for the United States Government for governmental purposes without payment to me of any royalty thereon.

This invention relates to orbiting satellites, and particularly to the pictorial representation of the pattern of relative positions attained by a plurality of earth satellites at any selected viewing time, and of the courses indicated by such pattern.

The invention is illustrated herein as being put into practice by use of circuitry and control apparatus operatively associated with a cathode ray display oscilloscope having above its screen surface a superimposed map of the earth's physical contours, which contours are represented in said map in accordance with the rules of plane-surface projection commonly known as "Mercator" projection, in deference to the originator of this mapping scheme.

Specific characteristics and objects of the invention are indicated in the following description of the embodiment illustrated in the accompanying drawings wherein.

Figure 4:
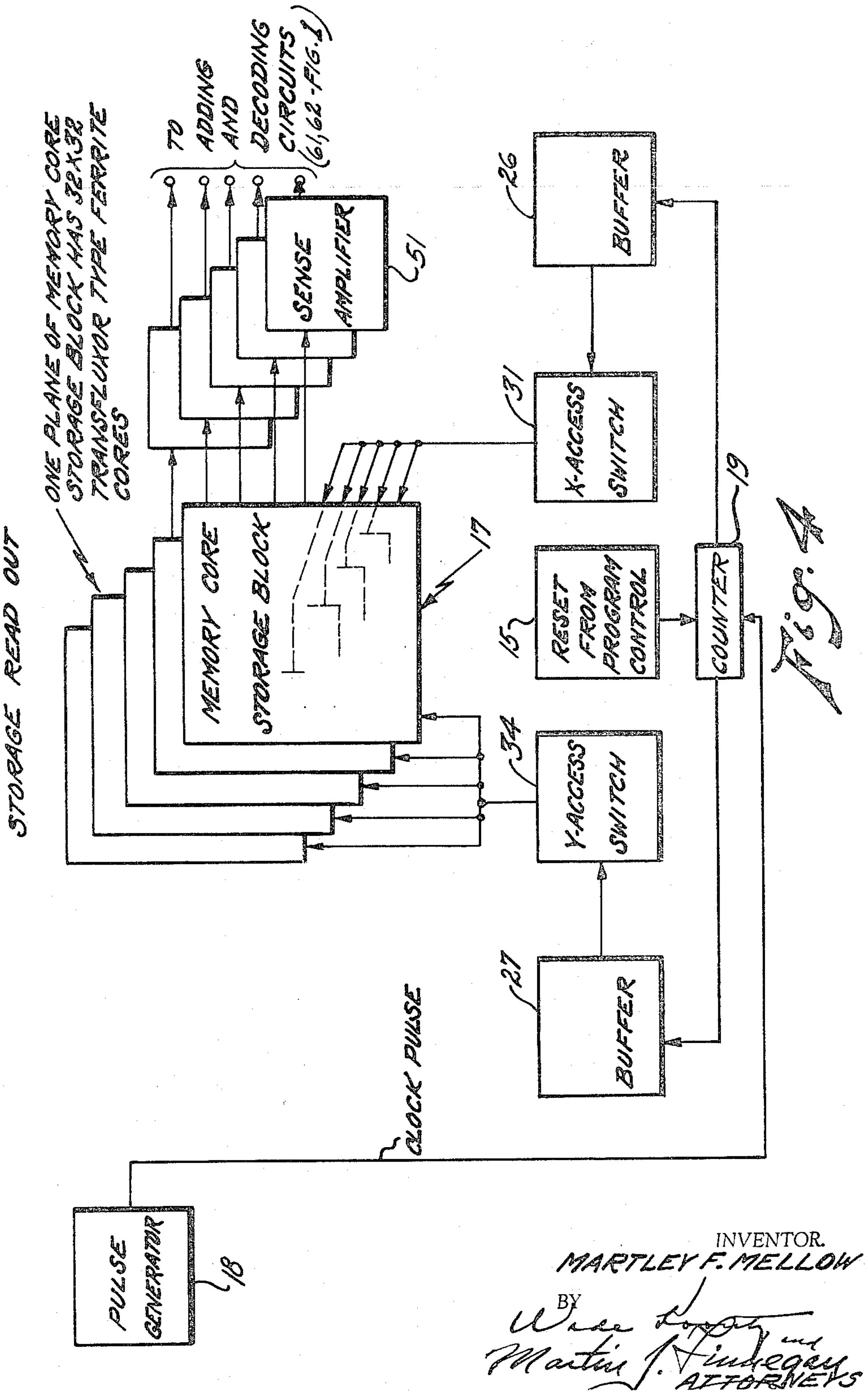
Figure 5:
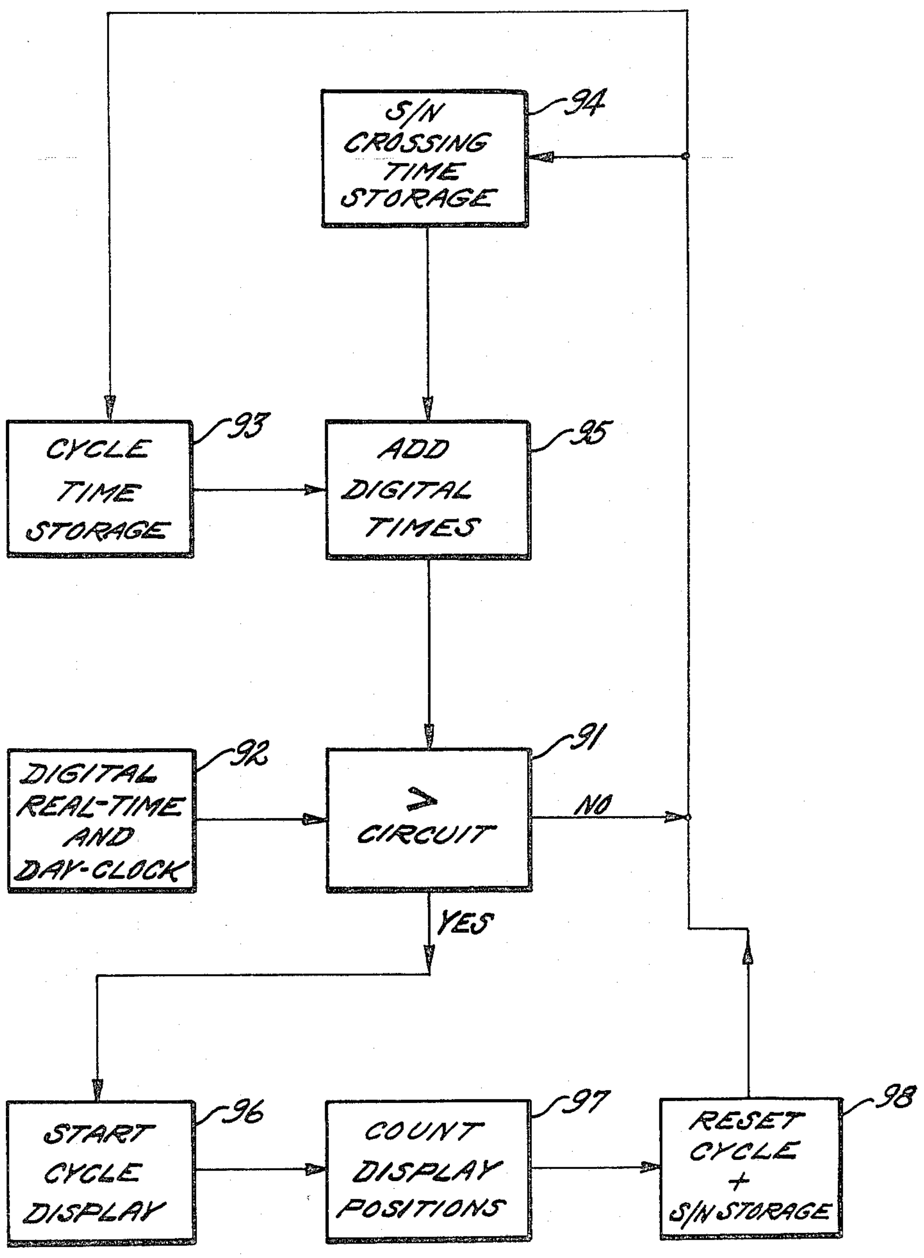

FIG. 4 is a block diagram of the storage read-out control, showing how a pulse generator drives specific cores, selected by the "X" and "Y" access switches, thru their hysteresis loop and the resultant information is sensed by the sense amplifiers; and FIG. 5 is a flow diagram in block form of how south-north crossings times are added to cycle time and compared with real time. It determines if, and when, a new S/N crossing position is to be used from storage.

Figure 1:
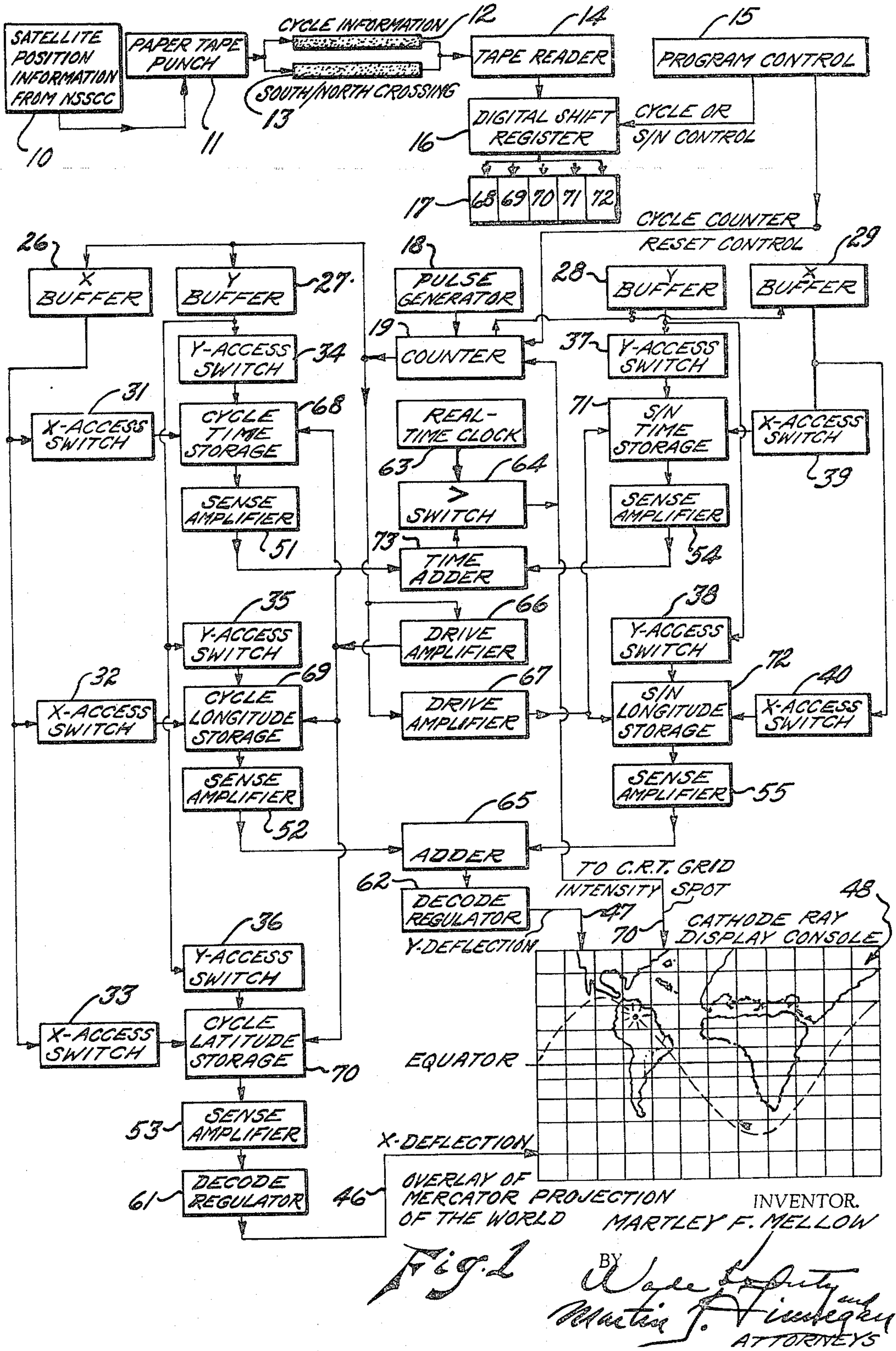
FIG. 1 is a block diagram of the digital satellite display system, showing the digital signal flow from the information obtained from a source such as the National Space Surveillance Control Center thru to the cathode ray tube display console; where the satellite's path will be displayed in the form of a sine wave, in relation to traversed points on a Mercator type map of the earth's surface.

The orbit of "Explorer VI," launched in August of 1959, differs from those of earlier satellites in that, although essentially elliptic, it presents a somewhat unorthodox pattern when displayed on a Mercator style map, represented sketchily at the lower portion of FIG. 1. This unorthodox pattern deviation, or irregularity, is due to the relation between the satellite's speed and the earth's rotational speed. At perigee, approximately 260 km. from earth, the satellite's speed is approximately 23,000 m.p.h. As the satellite coasts out to apogee, 42,000 km. away, it slows down to 2,200 m.p.h. Since any point on earth at the equator is traveling at a constant 1,000 m.p.h., Explorer VI's east-west speed component projected onto the earth is sometimes faster and sometimes slower than the earth's rotational speed.

In a plot of the satellite course $y=f(x)$ on a Mercator map (cartesian coordinate system), there are segments where $y$ is a multivalued function of $x$. Since the $x$ coordinate represents display time on the CRT, and the spot cannot be in more than one position at one time, the original deflection circuit had to be revised. The curve can be represented by two parametric equations $$y=f_1(t);\ x=f_2(t)$$

Then $x$ and $y$ are single-valued functions of time that can be stimulated in electronic function generators and applied to the $x$, $y$ deflection circuit of the CRT. The beam of the CRT traces out the desired function, and time is measured along the trace.

In co-pending U.S. patent application, Serial No. 237,167, filed June 29, 1962, by Frederick F. Slack and Martley F. Mellow, the latter being the applicant herein, there is illustrated and described computer apparatus of a preponderantly electromechanical or analog type for converting received course data into appropriate electrical signals for activation of the display circuitry of the cathode ray console. The present invention as illustrated in FIGS. 1 to 5 herein, includes apparatus of a predominantly electrical character for performing such data-to-display signal functions, the apparatus consisting primarily of a series of digital computing units for transmission, storage and timed delivery of electrical pulses for activation of the display producing elements of the cathode ray display console.

Referring first to FIG. 1, block 10 represents an information receiving unit in which the received information may be in decimal-binary form on paper tape by a Flexowriter (trademark) or other tape punching device 11. This paper tape is then "read" by reader 14 to extract therefrom the desired cyclic infomation indicated at 12 such as longitude, latitude, and time, which information is hereafter referred to as a "cycle word." Additional equational S/N crossing information of longitude, time, and day indicated at 13 is also extracted.

The tape is addressed to specific ferrite core storage locations by program control unit 15. The two words are stored in different sections of storage unit 17, the storage process being under the control of digital shift register 16. The tape reader 14 transforms the coded tape into voltage signal levels, and these levels are shifted by a tape reader shift pulse into the digital shift register 16. At the end of each word a "read" pulse causes the information in shift register 16 to be transferred into storage unit 17. Counter 19 and pulse generator 18 control the location of each word in sequence. The sequence of information put into storage is the same sequence of information taken out of storage and displayed. All "cycle words" are entered first, and then followed by all "S/N crossing words." From counter 19 the word-representing pulses are delivered to "X" and "Y" buffers, 26, 27, 28, and 29, the two first named receiving the cycle information 12, and the other two, the S/N crossing information 13. From these buffers, 26 to 29, the pulses proceed by way of access switches 31 to 40 inclusive, which control storage units 68 to 72 inclusive, and from there the information proceeds to the "X" and "Y" deflection input leads 46 and 47 of the cathode ray tube located in console 48, the path thereto including sense amplifiers 51 to 55, inclusive which combine at adder unit 65 and decoding regulators 61, 62.

Testing unit 64 causes intensity spot 70 to be displayed on cathode ray display console 48. If the proper time is not arrived at, as determined by real time clock 63, a pulse instead is emitted to counter 19 which controls drive amplifiers 66 and 67, which in turn control cycle time storage unit 68 and S/N time storage unit 71. The times as received through sense amplifiers 51 and 54 are combined in time adder 73 and then compared with real time clock 63 in testing unit 64.

Figure 2:
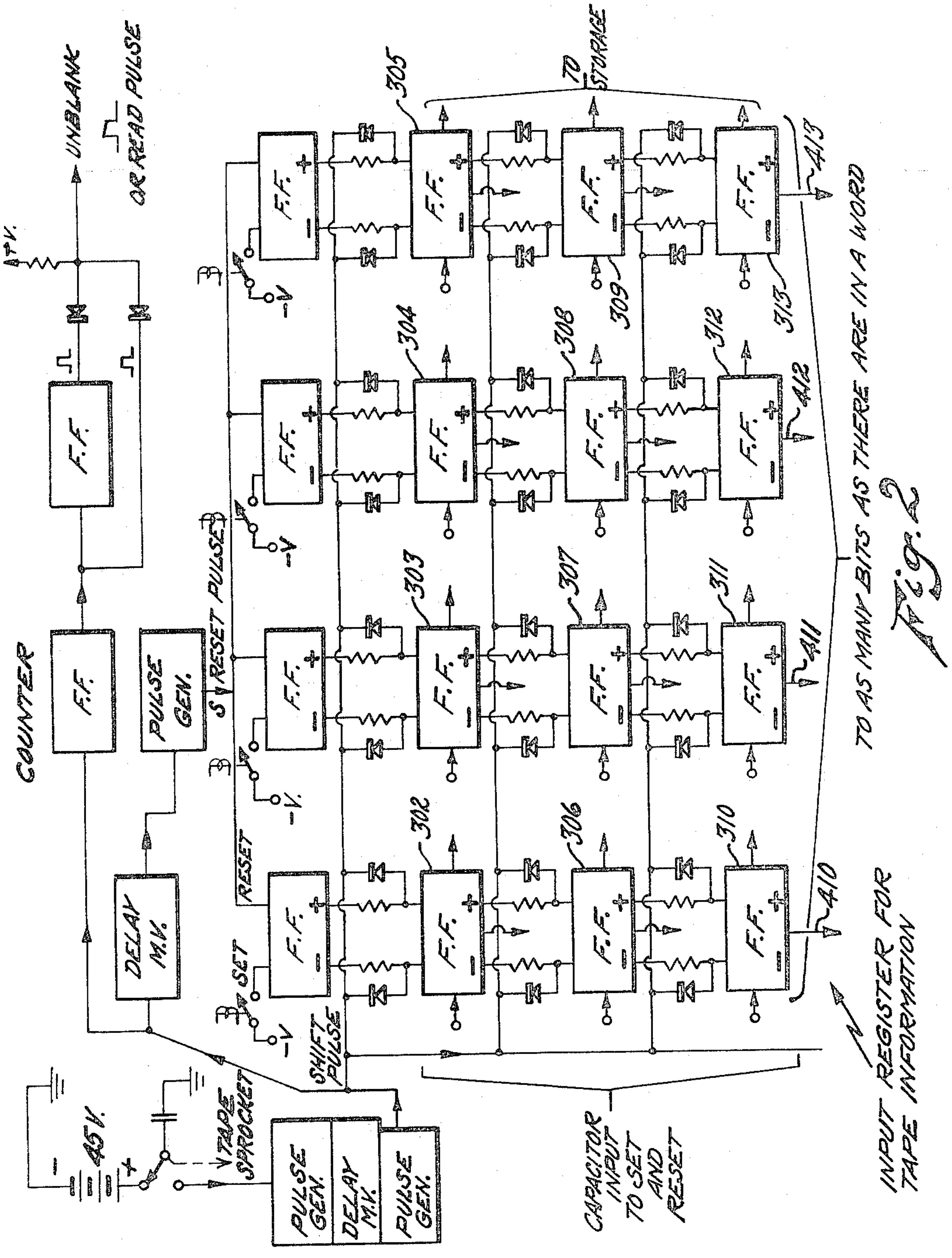
FIG. 2 is a schematic diagram of an input register. It shows how the tape information is converted to pulses thru the four weight relays, in the tape reader, to a four bit shift register.
Figure 3:
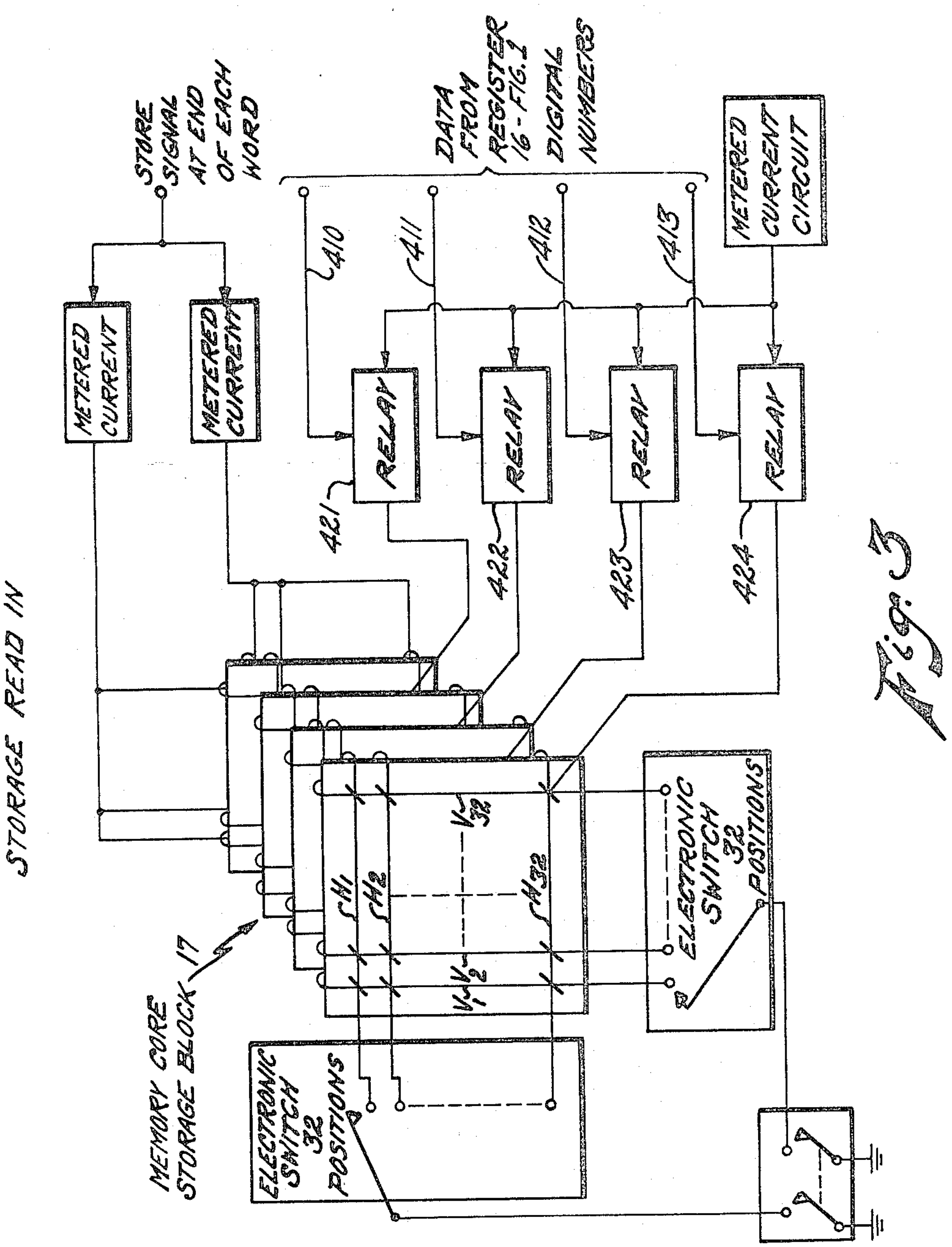
FIG. 3 is a block diagram of the storage read-in control from the input shift register. It shows the electronic counter switches that control the memory location of each bit.

As indicated in FIG. 2, the shift register 16 is composed of sixteen two-state flip-flop units, 302 to 313. All circuits are transistorized, except in the display console, and most all circuits are the plug-in modular type. A read signal, from the paper-tape reader 14, causes the information in the register from points 410 to 413 shown to be read in FIGS. 2 and 3 and are connected into relays 421 and 424 which are in turn connected into specific ferrite core memory planes. A memory plane is made up of 32 x 32 rows of ferrite cores. There are as many planes as there are bits in a word and the memory will hold as many words as there are ferrite cores in a plane. An electronic counter controls the "X" and "Y" coordinate input-lines to each plane. If a signal is to be stored in a word from the register, the flux in the ferrite core will be magnetized to hold the information. The cycle information goes into one block of memory planes and the S/N crossing information into another block of memory planes.

Operation controls are programmed by an operator to select the proper memory bank for the type of word being read in as well as specific satellite tracks.

The information in storage is interrogated in a sequential manner by 100 kc. read-out pulses. The output from storage is in parallel word groups. By using a non-destruct type of ferrite core the information in storage does not have to be read back in again when it is read out. However, there is a flux resetting pulse that follows every read out pulse to set the core to be read out again. These pulses are about five microseconds delayed from the read pulse. There is ten microseconds between each read pulse.

A drive amplifier, controlled by the 100 kc. oscillator, drives selected cores through their hysteresis cycle. These cores are selected in sequence in their planes by an electronic counter. This word counter automatically resets after all the words have been selected. Each plane has an "X" and "Y" coordinate switching line for every line of cores. In this manner a bit per plane is read out at the same time, and all the bits read out equal the information in one word. The resulting information released from storage is sensed in a sense amplifier as bit pulses. These pulses are set up in an output register as one word.

To continue the cycle function across the face of the display tube, a step function is generated by a "S/N crossing word." As the last word in the first cycle storage is read out, the word count control interrogates the next "S/N crossing word" and its latitude information is added to the second cycle latitude information. As a result the cycle information continues across the display tube. This presents a series of 10 microsecond spots across the projection indicating the satellite's projected track.

To indicate which spot is the real-time position of the satellite, as shown in FIG. 5, time comparator circuit 91 compares real time with stored cycle time and S/N crossing time added together at 95. The time information, being interrogated from storage at 100 kc. rate, is in an ascending order of magnitude. At the time the cycling of this information passes through a point that is greater than real time, an intensity pulse is generated at 96. This is indicated on the display as a position spot which is brighter than the rest. When the cycle information has reached 360° as determined by display position counter 97, a resetting pulse is generated at 98 to begin the function again.

The cycle word in the output register is divided into three sections, the time part is sensed in the comparator circuit; the latitude information is decoded thru a resistive network where each resistance equals the weight of the specific bit being decoded; and the longitude information is decoded in a similar manner. The "S/N crossing word," in the output register, is divided into two sections, the day and time part is sensed by the clock circuit, and the longitude information is added to the longitude cycle information and decoded as a "step function." This step or pulse orients the recycle information relative to real time. The output from the latitude and longitude decoding networds is in an analog voltage form. The weighed decoding resistors makes these "X" and "Y" potentials proportional to the latitude word, and the combined S/N crossing and longitude words. These voltages are fed to the "X" and "Y" deflection plate of a cathode ray tube and appear as spots of light.

As the spot of light is also in coincidence with a specific satellite timing gate, electronic correlation is made, and may be indicated as a satellite identification number on a digital read out device.

Real time altitude information may be displayed on a counter in units of miles. This is an auxiliary function and would have to be read in along with the "cycle word."

What is claimed is:

1. A digital system for displaying an orbit of a satellite comprising:

(a) a storage unit;
(b) means for reading into and out of the storage unit the positions of the satellite in terms of longitude and time when vertically over and crossing the earth's equator traveling in a given direction;
(c) means for reading into and out of the storage unit the positions of a cycle of the orbit of the satellite in terms of longitude, latitude, and time;
(d) a counter for controlling the sequence of positional information read into and out of the storage unit;
(e) a cathode ray oscilloscope having an "X" deflection control, a "Y" deflection control, and an intensity spot control;
(f) means for activating the "X" deflection control from the sequential read-out of the cycle latitude storage;
(g) means for adding the longitude of the equatorial crossing and the cycle longitude;
(h) means for activating the "Y" deflection control of the cathode ray oscilloscope fed from the output of the adding means;
(i) means for adding the time for the equatorial crossing and the cycle time, forming a time sum;
(j) a real time clock;
(k) and means for comparing the time sum with the real time clock, causing an intensity spot on the cathode ray oscilloscope provided the time sum is greater than the time of the real time clock, and causing the counter to advance the read-out provided the time sum is less than the time of the real time clock.

2. A digital system for displaying an orbit of a satellite according to claim 1 wherein the means for reading into storage comprise:

(a) a paper tape reader;
(b) a digital shift register fed by the paper tape reader;
(c) buffer units controlled by the counter;
(d) and access switches interposed between the storage units and the buffer units.

3. A digital system for displaying an orbit of a satellite according to claim 1 wherein the means for controlling the deflection of the cathode ray oscilloscope further comprise:

(a) drive amplifiers controlled by the counter;
(b) sense amplifiers fed by the storage units;
(c) and decode regulators fed by the sense amplifiers.

References Cited by the Examiner

Talmadge, Jr., "A Shipboard Satellite Position Display," N.R.L. Report 5638, U.S. Naval Research Laboratory, August 7, 1961.

ROBERT C. BAILEY, *Primary Examiner.*

DAVID G. REDINBAUGH, *Examiner.*

T. A. GALLAGHER, P. J. HENON, *Assistant Examiners.*